United States Patent [19]

Spinato

[11] Patent Number: 4,457,223
[45] Date of Patent: Jul. 3, 1984

[54] GRAPE CRUSHER

[76] Inventor: Cesare Spinato, 59 Fosters Rd., Greenacres, South Australia, Australia, 5086

[21] Appl. No.: 336,343

[22] PCT Filed: Apr. 30, 1981

[86] PCT No.: PCT/AU81/00048
§ 371 Date: Dec. 30, 1981
§ 102(e) Date: Dec. 30, 1981

[87] PCT Pub. No.: WO81/03111
PCT Pub. Date: Nov. 12, 1981

[30] Foreign Application Priority Data
May 1, 1980 [AU] Australia ............................ PE3371

[51] Int. Cl.³ ........................ A23N 1/00; A23N 15/02
[52] U.S. Cl. ........................................ 99/510; 99/513; 99/637; 99/638; 100/117; 100/145
[58] Field of Search ................. 99/495, 496, 509–513, 99/628, 637; 100/121, 117, 130, 171, 172, 144, 145; 241/260.1; 210/173, 174

[56] References Cited
U.S. PATENT DOCUMENTS

| | | |
|---|---|---|
| 539,055 | 5/1895 | Holthaus . |
| 1,428,687 | 9/1922 | Ferencz . |
| 2,088,657 | 8/1937 | Lindley ............................ 99/513 X |
| 2,089,215 | 8/1937 | Lomax ................................ 99/495 |
| 2,172,790 | 9/1939 | Ferrari ................................ 99/513 |
| 2,398,440 | 4/1946 | Monnet . |
| 2,478,651 | 8/1949 | Blachere . |
| 2,543,571 | 2/1951 | Ferrari ................................ 99/637 |
| 2,682,832 | 7/1954 | Lohre et al. ........................ 100/121 |
| 3,034,423 | 5/1962 | Demoisy . |
| 3,478,796 | 11/1969 | Ranfanelli ............................ 99/496 |

FOREIGN PATENT DOCUMENTS 162816 3/1953 Australia .
511903 6/1979 Australia .

Primary Examiner—Timothy F. Simone
Attorney, Agent, or Firm—Cushman, Darby & Cushman

[57] ABSTRACT

A grape crusher and de-stemmer comprising a drum (5) having a spiral rotor blade (8) eccentrically mounted in the drum to have a greater clearance at the top and at the bottom. The drum is perforated with perforations (18,19) and means are provided for rotating the rotor at high speed to remove the berries from the stalks and to split the berries so that the juice may be extracted.

7 Claims, 3 Drawing Figures

GRAPE CRUSHER

This invention relates to the crushing of grapes, and more particularly to a crusher adapted to rupture the skins of the grapes in a simple manner.

BACKGROUND OF THE INVENTION

Conventionally grape crushers include the step of passing the bunches of grapes through at least a pair of grooved spaced rollers so that the grape berries are crushed to allow the juices to be extracted therefrom by a pressing operation.

These rollers through which the grapes pass must crush the grapes and also tend to damage the stems and stalks, and often tend to break these into smaller pieces.

U.S. Pat. No. 3,034,423 by Albert Demoisy discloses a continuous rotary press for extracting liquid from fragile products (for example fruits) where a rotor operates within a perforated housing, the rotor being divided into a plurality of compartments and carrying rollers and endless track members to press the material retained by the perforated housing.

R. G. Lohre et al in U.S. Pat. No. 2,682,832 discloses an apparatus for removal of juice from citrus fruit, with the rotor being mounted eccentrically within the rotatable outer casing so that the fruit is compressed to squeeze the juice therefrom.

U.S. Pat. No. 3,011,430 discloses an orange juice extractor wherein the fruit is subjected to a gradually increasing pressure, to squeeze the juice from the orange, the extractor including a rotor acting in conjunction with a surrounding drum.

U.S. Pat. No. 292,524 by Wilson and U.S. Pat. No. 2,119,972 by Steinbiss each disclose apparatus having a spiral or similarly shaped rotor to move the material, the spiral body increasing in diameter to produce an increasing pressure.

It is an object of this invention to provide a grape crusher in which the grape berries are crushed, split or opened in a simple manner to allow the juice to be extracted therefrom.

It is a further object to provide a grape crusher in which there is a ready separation of the stalks and stems from the crushed berries and pips with there being a minimum of damage to the skins themselves and also to the stems and stalks.

BRIEF STATEMENT OF THE INVENTION

Thus there is provided according to this invention a grape crusher comprising spiral means to transport the grapes through a treating zone, means for rotating the spiral at a speed such that the grapes are forced by centrifugal force to the wall of the crusher so that the action of the spiral on the grapes adjacent the wall causes the berries to be split and opened.

Throughout the specification while reference is made to the invention as a grape crusher, it is to be realised that the term crusher is not used in the usual sense of pressure being applied between rollers or the like, that is merely used to refer to the action of breaking the skins of the grapes to open up the grapes so that the juice can be extracted.

In a preferred form the crusher is a cylindrical drum, a spiral being mounted within the drum.

The spiral in its preferred form can comprise a two bladed spiral having a large pitch, the spiral blades being mounted on radial arms.

The cylindrical drum is preferably formed of metal and is provided with a plurality of apertures. Adjacent the inlet end these apertures are of relatively small size, and then increase in diameter toward the outlet end.

It is to be noted that in the preferred form the spiral is not mounted centrally within the cylindrical drum, but is so positioned that it has a small clearance at the bottom while at the top there is a larger clearance.

The drum is provided with an inlet chamber or hopper, this being offset from the central axis of the drum and is thus positioned to one side of the vertical diameter of the drum and on that side where the spiral blades pass downwardly so that there is little or no tendency for any of the grapes being fed in to fly up out of the drum.

Means are provided to drive the spiral at a relatively high speed, this being preferably by an electric motor or the like, either mounted on or adjacent to the cylindrical drum. It has been found that with the above clearances given and the pitch as above stated that by rotating the spirals at a speed of 700 revolutions per minute or in other words approximately 11 meters per second circumferential speed, this speed is sufficient to lift and throw the grapes against the wall of the drum and due to increasing and decreasing clearance as the spiral blades move around the wall of the drum the grape berries are split and opened and removed from the stalks.

The stalks in this way are not crushed or bruised to any appreciable extent and the blades of the spiral as they pass over the openings in the drum pass the split berries, skins and pips through these openings to be collected for later pressing.

A large quantity of juice is extracted from the grapes in the initial opening and crushing of the grapes, and this juice is collected in the initial or earlier part of the crushing action, this juice collected being exceptionally free from any skins, pips, stems or twigs or the like, and as the skins themselves are not crushed the juice extracted is the free juice within the grape itself and is thus a highly desirable juice which is obtained in this manner.

DESCRIPTION OF THE PREFERRED EMBODIMENT

Figure 1:
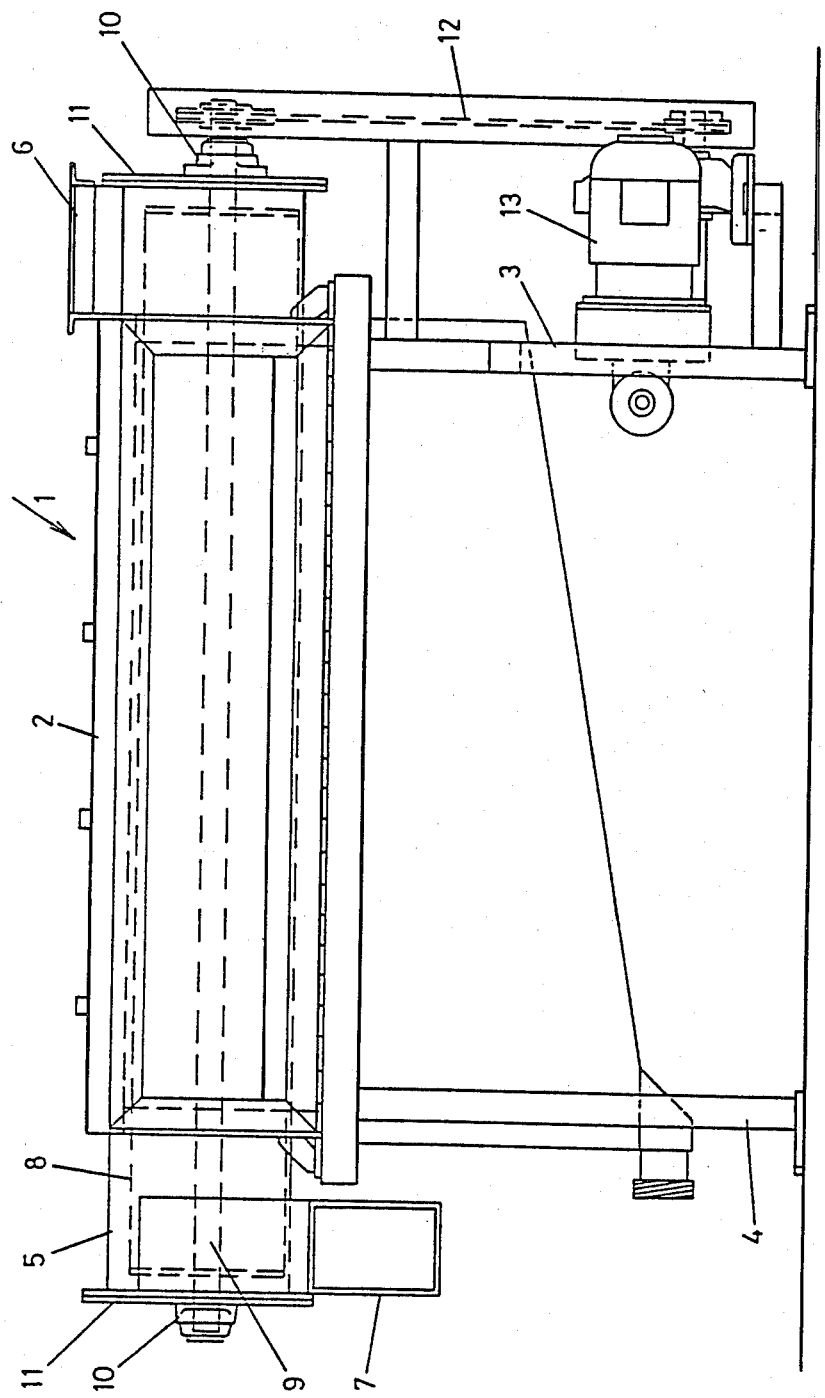
FIG. 1 is a side elevation of the crusher according to the invention
Figure 2:
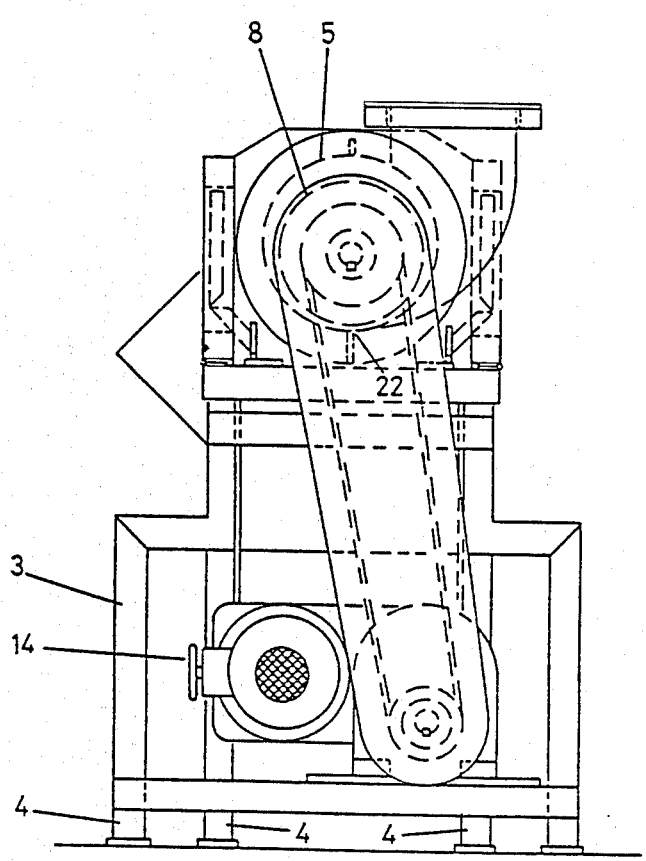
FIG. 2 is an end elevation thereof.
Figure 3:
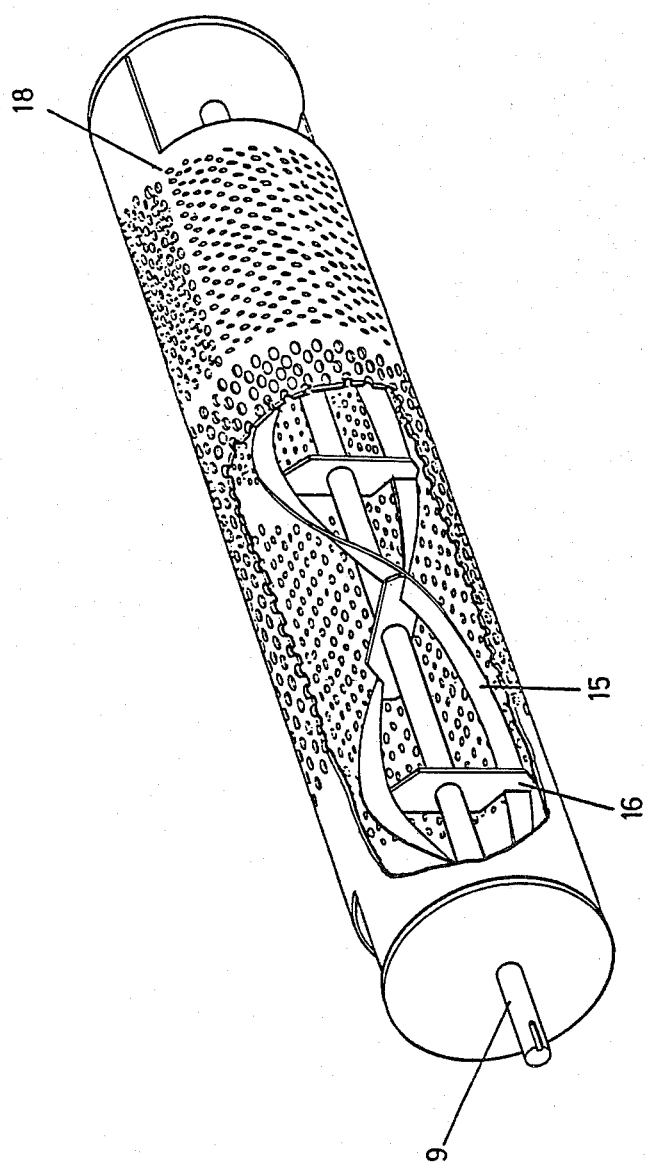
FIG. 3 is a view of the spiral blades and the drum portion being broken away for clarity

The crusher and the stemmer 1 comprises a drum assembly 2 mounted on a frame base 3 having a plurality of legs 4. The drum assembly 2 includes a drum 5 having an inlet 6 and outlet 7.

A spiral rotor 8 is fixed to a shaft 9 mounted in bearings 10 affixed to end plates 11 on the ends of the drum 5. The spiral rotor 8 is driven by a feed belt drive from a variable speed geared motor 13 having a variable speed adjusting hand wheel 14.

Beneath the drum 5 there is supported on the frame 3 a drain tank to collect the juice extracted or removed from the grapes passing through the drum.

The rotor blade 8 comprises a pair of spiral blades 15 mounted on blade arms 16 attached to the shaft 9, each blade having a limited depth 17.

The blade arms 16 are plates supporting the blades at a distance from the shaft 9.

The drum 5 is provided with a plurality of openings, these varying as desired. However in a preferred form more holes 18 are provided adjacent the inlet opening 6, and also small holes 19. Spaced further along the drum the holes 20 are large in diameter.

As shown and in accordance with the invention, the shaft 9 is not situated centrally of the drum, but is displaced slightly downwardly so that the clearance 21 at the top is greater than the clearance 22 at the bottom. In this way as the grapes move from the area of greater clearance to the lesser clearance they are split and opened by the action of the blade on the drum thus opening the berry and allowing the juice to escape.

In a typical example of a grape crusher and de-stemmer capable of handling ten tonnes of grapes per hour, the rotor blade could be 1,632 millimeters in length and in this length each blade turns through 460 degrees, that is one and one quarter turns so that the angle of the blade to the axis of the blade is at a relatively shallow angle with the diameter of the blade being 240 millimeters.

The diameter of the drum could be about 286 millimeters so that the rotor by being offset then gives a clearance at the bottom of 6 to 10 millimeters with corresponding larger clearance at the top.

The rotor is adapted to run at a speed of approximately 11 meters per second circumferential speed and this lifts and maintains the grapes against the internal surface of the drum by a centrifugal force and due to the variation in clearance, as the grapes move toward the lower area they are effectively split and opened by the action of the rotor blades on the interior of the drum.

This splitting allows the juice to come free of the berries. The smaller holes at the inlet end of the drum can be in the vicinity of 20 millimeters in diameter while the holes in the remainder of the drum can be in the order of 28 millimeters.

In a preferred form adjacent the 20 millimeter holes there are provided a plurality of slots around the portion of the drum adjacent the inlet opening, these slots being 20 millimeters long and 8 millimeters wide.

It has been found that with the arrangement of the slots and holes that the juices and berries can pass through these holes, but that the stalks and stems are retained for discharge out through the outlet end of the drum so that the berries can then be further processed by pressing to extract the juice therefrom. As the berries have been removed from these stalks and split and opened without any undue damage to the skins themselves then a pure juice is extracted without any contaminants from the skin and or stalks.

Although in the preferred form dimensions are given as an example only of the invention, it is to be realised that the production unit will be much larger in diameter and of greater length, thus being able to handle greater quantities of grapes.

It will be realised that in this instance where the crusher is made of differing sizes, that the speed with which the spiral must be rotated could well be varied and as the diameter is increased the number of revolutions per minute would be decreased to give a peripheral speed similar to the above.

Also it is to be realised that with the larger units the speed may have to be varied or increased to cause the bunches of grapes to be held by centrifugal force against the walls, or can be varied so that the grapes may tend to tumble or fall during the operation.

The large pitch of the spiral will gradually move the grapes through the crusher, these spirals thus acting as beaters having a slight inclination to move the grapes and must through the crusher. The pitch of the spirals could vary between one turn for 0.5 meters to one in 2 meters.

It will realised that while there is disclosed the continuous spiral, that the spiral could be comprised of a number of individual paddles or beaters each inclined at an angle, these beating and pressing the grapes against the outer wall in order to remove the berries from the stems and to split the skins to allow the subsequent extraction of the juice.

Thus it will realised that various modifications can be made to the above invention relating to the various sizes and dimensions, as long as the basic concept of a relatively high velocity is achieved in order to produce the desired effect with the paddles, beaters or other blades or the spiral progressively moving the grapes through the unit.

The claims defining the invention are as follows:

1. A grape handling and de-stemmer apparatus comprising a perforated generally horizontal stationary drum, an inlet at one end of the drum, an outlet at the opposite end, a driven shaft eccentrically mounted within said drum, blades mounted on said driven shaft to provide a clearance between the blades and the internal surface of the drum to move grapes from said inlet to said outlet, the clearance between said blades and said drum being greater at the top than the bottom, and means to rotate said shaft at a speed to move the grapes in range of about 5 meters per second to about 20 meters per second circumferential speed over the internal surface of the drum while removing the grapes from the stalks and opening the grapes for the juice to be extracted by rolling said grapes between the blades and the internal surface of the drum in the decreasing clearance at the bottom of the drum to split said grapes, the grapes falling from the blades in the increased clearance toward the top of the drum.

2. A grape handling and de-stemmer apparatus as defined in claim 1 characterized by a pair of blades supported on arms mounted on said shaft, said blades having a flat spiral in the range of one turn per 0.5 meter to one turn in 2 meters.

3. The apparatus as defined in claim 2 characterized in that the spiral is a continuous spiral.

4. The apparatus as defined in claim 1 characterized in that the spiral is formed of a number of sections spaced circumferentially and longitudinally of each other.

5. The apparatus as defined in claim 1 characterized in that the inlet is tangential to the drum in the direction of rotation of the spiral blades.

6. The apparatus as defined in claim 1 characterized in that the drive means is a variable speed drive means.

7. A grape handling and de-stemmer apparatus comprising a perforated generally horizontal stationary drum, a tangential inlet at one end of the drum, an outlet at the opposite end of the drum, a driven shaft eccentrically mounted within said drum, a pair of blades supported on arms mounted on said driven shaft, said blades having a clearance from the internal surface of the drum, said blades having a flat spiral to move the grapes from the inlet to the outlet end, and means for rotating said driven shaft at a peripheral speed to maintain the grapes by centrifugal force on the wall of the drum up to near the top of the drum, the driven shaft being mounted to give the blades a greater clearance at the top of the drum than at the bottom of the drum, the clearance at the bottom being sufficient to give a rolling action to the grapes as they approach the lesser clearance to crack and open the grapes without crushing, the greater clearance at the top freeing the grapes from the blades, the action of the blades opening the grapes and removing the stalks therefrom.

* * * * *